United States Patent [19]

Shimizu

[11] Patent Number: 5,070,501
[45] Date of Patent: Dec. 3, 1991

[54] TOKEN PASSING TYPE SLOTTED LOOP NETWORK SYSTEM WITH MEANS FOR ENABLING HIGH SPEED ACCESS CONTROL AND SIMPLE FRAME SLOT STRIPPING

[75] Inventor: Hiroshi Shimizu, Tokyo, Japan

[73] Assignee: NEC Corporation, Tokyo, Japan

[21] Appl. No.: 535,619

[22] Filed: Jun. 11, 1990

[30] Foreign Application Priority Data

Jun. 9, 1989 [JP] Japan .................................. 1-147541
Jun. 9, 1989 [JP] Japan .................................. 1-147542
Jul. 14, 1989 [JP] Japan .................................. 1-183051

[51] Int. Cl.$^5$ ........................ H04J 3/00; H04Q 11/04
[52] U.S. Cl. ................................. 370/85.4; 370/85.5; 340/825.05
[58] Field of Search ................... 370/85.4, 85.5, 60, 370/94.1, 85.6, 825.05

[56] References Cited

U.S. PATENT DOCUMENTS

| 4,709,364 | 11/1987 | Hasegawa et al. | 370/85.4 |
| 4,713,807 | 12/1987 | Caves et al. | 370/85.4 |
| 4,932,023 | 6/1990 | Geyer et al. | 370/85.4 |

FOREIGN PATENT DOCUMENTS

| 0068156 | 3/1989 | Japan | 370/85.4 |
| 0098343 | 4/1989 | Japan | 370/85.4 |

Primary Examiner—Douglas W. Olms
Assistant Examiner—Dang Ton
Attorney, Agent, or Firm—Sughrue, Mion, Zinn, Macpeak & Seas

[57] ABSTRACT

A token passing slotted loop network comprising a master station and a plurality of slave stations, a plurality of slots circulating through the loop and each of the slots having a fixed length and comprising a header portion and a data carrier portion, a particular one of the stations having the token transmitting its own data signal by use of one or more of the slots, the particular station transmits an end mark in the header of a particular one of the slots at an end of transmission of the own data signal and strips incoming slots from a start of the transmission of the own data signal unit reception of the end mark circulated through the loop. The particular station frees the token by inserting the token in the header of the particular slot. The token can be inserted in the header of one of the slots after completion of the transmission. Each of the slave stations writes into a priority request section in the header of each slot a particularly priority request representative of a priority level of the own data signal when the own data signal occurs thereat. The master station writes the highest one of the priority request into a priority section in the header of each slot. Each slave station detects the priority in the priority section and starts to acquire the token when the detected priority is lower than the particular priority request.

9 Claims, 7 Drawing Sheets

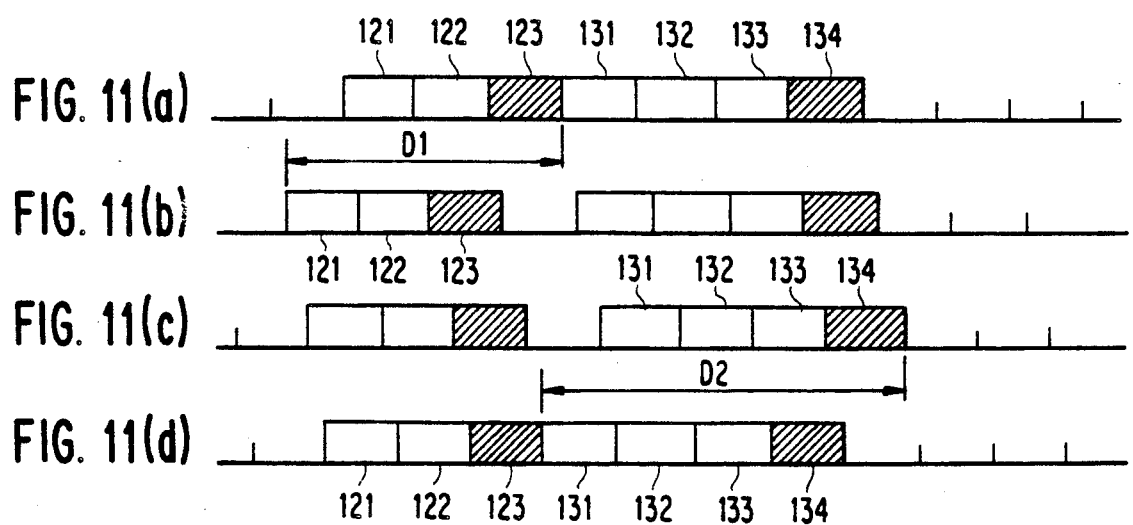

TOKEN PASSING TYPE SLOTTED LOOP NETWORK SYSTEM WITH MEANS FOR ENABLING HIGH SPEED ACCESS CONTROL AND SIMPLE FRAME SLOT STRIPPING

BACKGROUND OF THE INVENTION

1. Field of the Invention

The present invention relates to a token passing type slotted loop network system wherein a plurality of node stations are connected by transmission lines to form a data transmission ring or loop, each station sending out its own data signal in a slot or slots on the loop after capturing the token, and in particular, to frame stripping, access control and priority control in such a token passing type slotted loop network system.

2. Description of the Prior Art

In such a slotted loop network system, a particular one of the node stations transmits its own data signal by use of one or more of the plurality of slots. However, the particular node station is responsible for stripping from the loop the slot which is used for transmitting the own data signal. The stripping is performed by use of address data in the own data signal or by node address data attached into the used slot. However, it takes a long time to detect the address data so that stripping is delayed.

As the data signal to be transmitted, are two types, one being a simple packet signal having a source address and a destination, the other being an ATM (Asynchronous Transfer Mode) type having a different address data signal which is called a VCI (Virtual Channel Identifier) which is different from those source and destination address type. In the loop network system handling those different type data signals, the stripping is further complex.

In a conventional token passing ring (IEEE802.5), a token frame is circulated through the loop. When a particular one of node stations acquires the token frame, the particular node station has a transmission right to transmit the own data signal together with the token to the loop. However, when the transmission of the own data signal is ended, the token cannot be freed until the final data frame returns to the particular node station. Therefore, the process for acquiring the token frame by another node station is comparatively complex and takes a long time.

In order to enable a high speed access control, a method is known in the prior art wherein the particular node station frees the token just after completion of the transmission of the own data signal. The FDDI (Fiber Distributed Data Interface) uses such a method. However, it is impossible in the method to perform the priority control of transmission requests originated from several node stations.

SUMMARY OF THE INVENTION

Accordingly, it is an object of the present invention to provide a token passing type slotted loop network system which readily performs slot stripping without any address data.

It is another object of the present invention to provide a token passing type slotted loop network system which performs access control with a reduced time.

It is another object of the present invention to provide the above described token passing type slotted loop network system in which priority control is also possible.

According to the present invention, a token passing type slotted loop network system is obtained which comprises a master node station and a plurality of slave node stations connected to each other to form a data transmission loop, a plurality of slots being circulated on the loop for transmitting a data signal from a particular one of the node stations having the token. Each of the slots having a fixed length and comprises: a header portion comprising an end/non-end code section for carrying the end/non-end code, the end code and the non-end code representing an end and a non-end of transmission of the data signal; and a data carrier portion for carrying the data signal. Each of the master and slave node stations comprises: multiplexing means for multiplexing input signals applied thereto to produce a multiplexed signal, the multiplexed signal being delivered therefrom to the loop; transmission buffer means for holding the data signal to be transmitted to the loop as a buffered data signal as one of the slots; demultiplexing means for demultiplexing each of the slots sequentially incoming thereto as an incoming slot signal to produce the end/non-end code section and a remaining portion as a separated end/non-end signal and a separated data signal; selecting means coupled to the demultiplexing means and the transmission buffer means for selecting the separated data signal at a repeating mode and the buffered data signal at a transmission mode as a selected signal, the selected signal being delivered to the multiplexing means as one of the input signals; end-mark processing means coupled to the demultiplexing means for repeating the separated end/non-end signal to the multiplexing means as another one of the input signals at a repeating condition, the end-mark processing means producing the non-end code signal and the end code signal to deliver the non-end code signal and the end code signal to the multiplexing means as another input signal at a non-end condition and an end condition, respectively; and control means coupled to the demultiplexing means, the transmission buffer means, the selecting means and the end-mark processing means for controlling the end-mark processing means and the selecting means.

In the particular node station, the control means make the end-mark processing means and the selecting means be in the non-end condition and in the transmission mode, respectively. The control means monitors the transmission buffer means and makes the end-mark processing means be in the end condition to produce the end code signal at an end of transmission of the buffered data signal. The control means makes the end-mark processing means and the selecting means be in the repeating condition and in the repeating mode, respectively, when the control means detects that the demultiplexed end/non-end signal is the end code signal. In each of the node stations other than the particular node station, the control means makes the end-mark processing means and the selecting means be in the repeating condition and in the repeating mode, respectively.

According to another aspect of the present invention, the header portion further comprises a token/non-token code section for carrying one of a token code representing the token and a non-token code. The demultiplexing means separates the token/non-token code section from the incoming slot signal to produce a separated token/-non-token signal. Each of the master and the slave node stations further comprises token processing means coupled to the demultiplexing means for repeating the separated token/non-token signal to the multiplexing means as another one of the input signals at a repeating condition. The token processing means produces the non-token code signal and the token code signal to deliver the non-token code signal and the token code signal at a non-token condition and a token condition, respectively, to the multiplexing means as another input signal, the control means controlling the token/non-token processing means.

The control means makes the token processing means be in the non-token condition in order to acquire the token when detecting that the transmission buffer means holds the buffered data signal, and the control means acquires the token when detecting that the separated token/non-token signal is the token code signal. Thus, the control means, as the control means in the particular node station, makes the end-mark processing means and the selecting means be in the non-end condition and the transmission mode.

In the particular node station, the control means makes the token processing means be in the token condition so as to free the token at the end of transmission of the buffered data signal and then places the token processing means into the repeating condition.

When the data signal has a priority of one of different priority levels from a minimum level and a maximum level, the header portion further comprises a priority request section for carrying a priority request representing a priority level requested at each of the slave node stations, and a priority section for carrying the highest priority level in the priority request as an indication priority level. The demultiplexing means separates the priority request section from the incoming slot signal as a separated priority request. The master node station further comprises priority control means coupled to the demultiplexing means responsive to the separated priority request for detecting the highest priority level in the separated priority request as a detected priority level to set the detected priority level in the priority section as the indication priority level. The priority control means sets a non-request code in the priority request section.

The control means in each of the slave node stations monitors the transmission buffer means to detect a particular one of the priority levels requested by the buffered data signal in the transmission buffer means as a particular priority request. Each of the slave node stations further comprises priority register means coupled to the control means for holding the particular priority request; and priority request processing means coupled to the demultiplexing means and the priority register means for producing a specific priority request from the particular priority request and the separated priority request to deliver the specific priority request as another one of the input signals to the multiplexing means.

In each of the slave node station, the demultiplexing means demultiplexes the priority section in the incoming slot signal as a separated priority signal. The separated priority signal is delivered as another of the input signals to the multiplexing means. The control means responsive to the separated priority signal compares the indication priority level of the separated priority signal with the particular priority request level and makes the token processing means be in the non-token condition when the particular priority request level is equal to or higher than the indication priority level of the separated priority signal.

When the priority is divided into N (N being an integer) levels from the minimum level to the maximum level, the priority request is represented by a binary code of N digits with "1" different digits representing different priority levels so that "1" of the highest and the lowest digits represents the maximum and the minimum levels. The priority request processing means comprises means for writing "1" into a particular digit in the separated priority request signal corresponding to the particular priority request.

BRIEF DESCRIPTION OF THE DRAWINGS

FIG. 11 is a diagram view illustrating slot transmitting operation in adjacent node stations.

DESCRIPTION OF PREFERRED ENBODIMENTS

Figure 1:
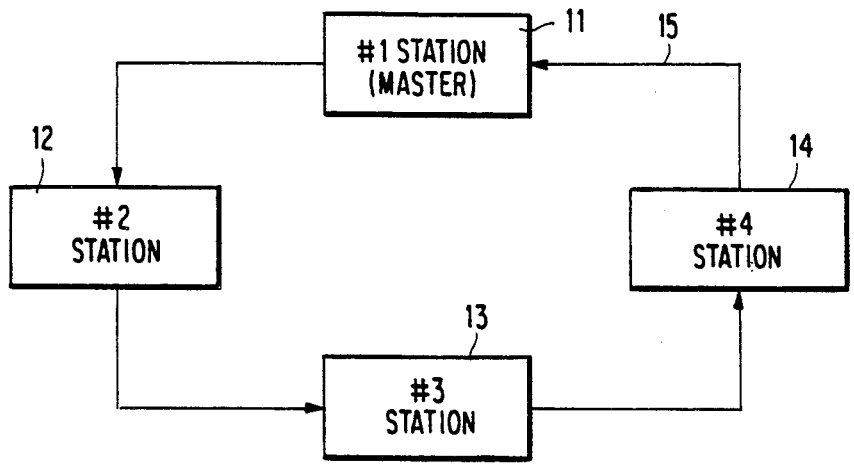
FIG. 1 is a diagram view of a token passing type slotted loop network system to which the present invention is applicable.

Referring to FIG. 1, a token passing type slotted loop network system comprises a plurality of node stations (four stations 11 through 14 are exemplarily shown) connected through transmission lines to form a ring or loop 15, as well known in the prior art. The first (#1) node station 11 is a master station and the other second through fourth (#2-#4) node stations 12-14 are slave node stations.

A plurality of slots circulate on the loop 15 under control by the master node station 11 and repetition at each of the slave node stations 12-14.

Figure 2:
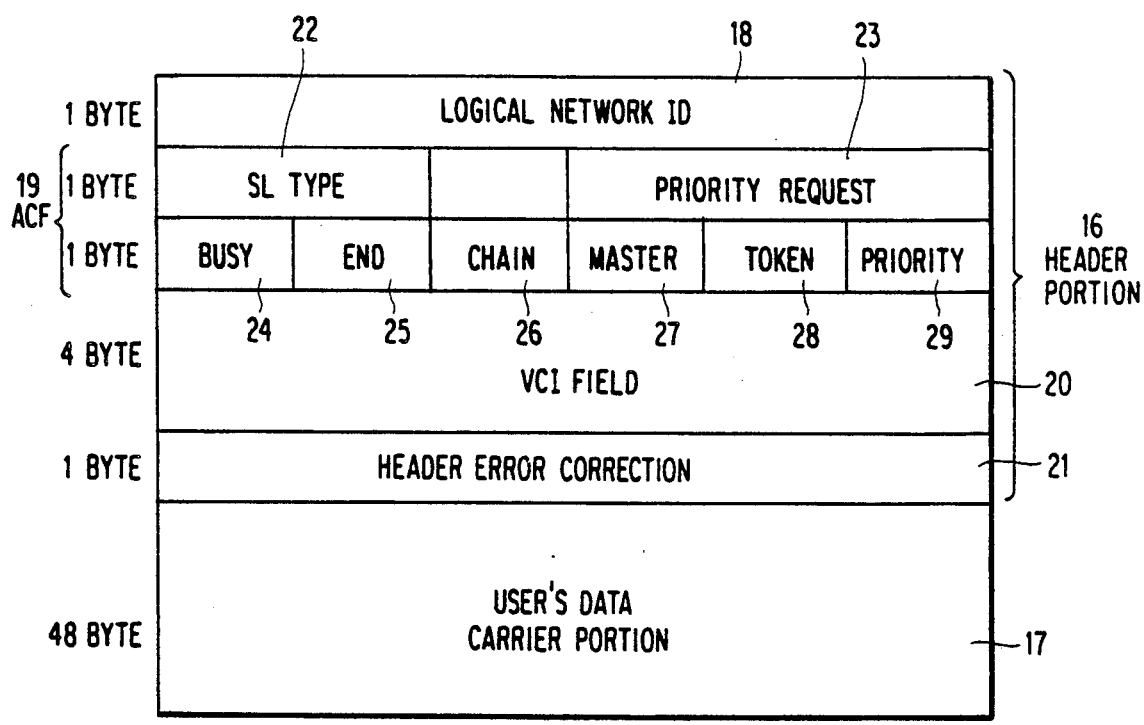
FIG. 2 is a view illustrating a slot format used in an embodiment of the present invention.

Referring to FIG. 2, each slot has a format of a fixed length which comprises a header portion 16 of eight (8) bytes and a user's data carrier portion 17 of forty-eight (48) bytes. The header portion 16 comprises a logical network identification (ID) field 18 of one byte, an access control field (ACF) 19 of two (2) bytes, a VCI field 20 of four (4) bytes and a header error correction field 21 of one byte.

The logical network ID portion 18 is for carrying an identifier representative of a logical network type used in the network system.

The ACF field 19 is for carrying access control data and comprises a slot type identifier (SL TYPE) section 22, a priority request section 23, a busy/idle (BUSY)

section 24, an end mark (END) section 25, a chaining code (CHAIN) section 26, a master/slave (MASTER) section 27, a token/non-token (TOKEN) section 28, and a priority section 29.

The slot type identifier section 22 is for carrying a code representative of a type of the user's data signal which is transmitted by the same slot. There are two types for the user's data signal, that is, a simple packet type and an ATM type as described in the preamble. The slot type identifier is a one-bit code and "0" and "1" of the code represent, for example, the simple packet type and the ATM type, respectively.

The priority request section 23 is for carrying a priority request signal (PRI-REQ) of a request code representing priority levels requested in node stations. The request code has a four-bit length in the present embodiment. The priority is divided into four levels, that is, the minimum level "I" through the maximum level "IV" which are corresponding to "1" of the lowest digit through the highest digit of the four-bit request code, respectively. Therefore, the four priority levels "I" to "IV" are represented by "0001" to "1000" which are called first through fourth requested level code R1 to R4. The requested level codes R1 to R4 are collectively called the request code R.

The busy/idle section 24 is for carrying a one bit code signal representing whether the same slot is busy or idle. The code is "1" when the slot is busy but is "0" when the slot is idle.

The end mark section 25 is for carrying an end/non-end signal of one bit representing whether or not the same slot is the last one for transmitting the current user's data signal. When the end/non-end signal is "1", the signal means that the same slot is the last one and is called an end mark signal E1. When the end/non-end signal is "0", the signal means that the same slot is not the last one and is called a non-end mark signal E0.

The chaining code section 26 is for carrying a chaining code signal of two-bit length which identifies a section of the current user's signal transmitting the same slot. When the current user's data signal is wholly transmitted in the same time slot, the chaining code is "00" and is called a single code signal C0. The current user's data signal is the ATM type signal, the chaining code signal is the single code signal C0. When the current user's data signal is a comparatively large length so that it should be divided into a plurality of data sections which are transmitted by a plurality of subsequent slots, a start code "10" signal C1 and a last code "01" signal C3 are given in the individual chaining code sections of the first and the last slots for transmitting the first and the last data sections, respectively, and an intermediate code "11" signal C2 is given in the chaining code section or sections of intermediate slot or slots for transmitting intermediate data section or sections.

The master/slave section 27 is for carrying a code of one bit representing which the same slot is used by, the master or the slave node station. When the same slot is used by the master node station, the code is "1" and is called a master code M1. While, the code is "0" and is called a slave code M0 when the same slot is used by any one of the slave node stations.

The token/non-token section 28 is for carrying a token/non-token signal of one bit. The token signal T1 has a token code "1", while the non-token signal T0 has a non-token code "0". In the known manner, the token signal T1 is in only one of the slots on the loop when no mode station acquires the transmission right, while it is not in any one of the slots on the loop when one of the node stations has the transmission right. However, it should be noted that the token signal T1 is inserted in the header portion 16 in one of the slots.

The priority section 29 is for carrying a priority signal (PRI) as an indication priority level representative of the highest priority level in the priority request section 23 written during a previous complete circulation of the same slot through the loop. Since the priority is divided into four levels "I" through "IV" as described above, the priority levels "I" through "IV" are represented by binary codes "00" through "11". Those binary codes are referred to as priority level codes P0 through P3, respectively, and are collectively called a priority code P.

Figure 3:
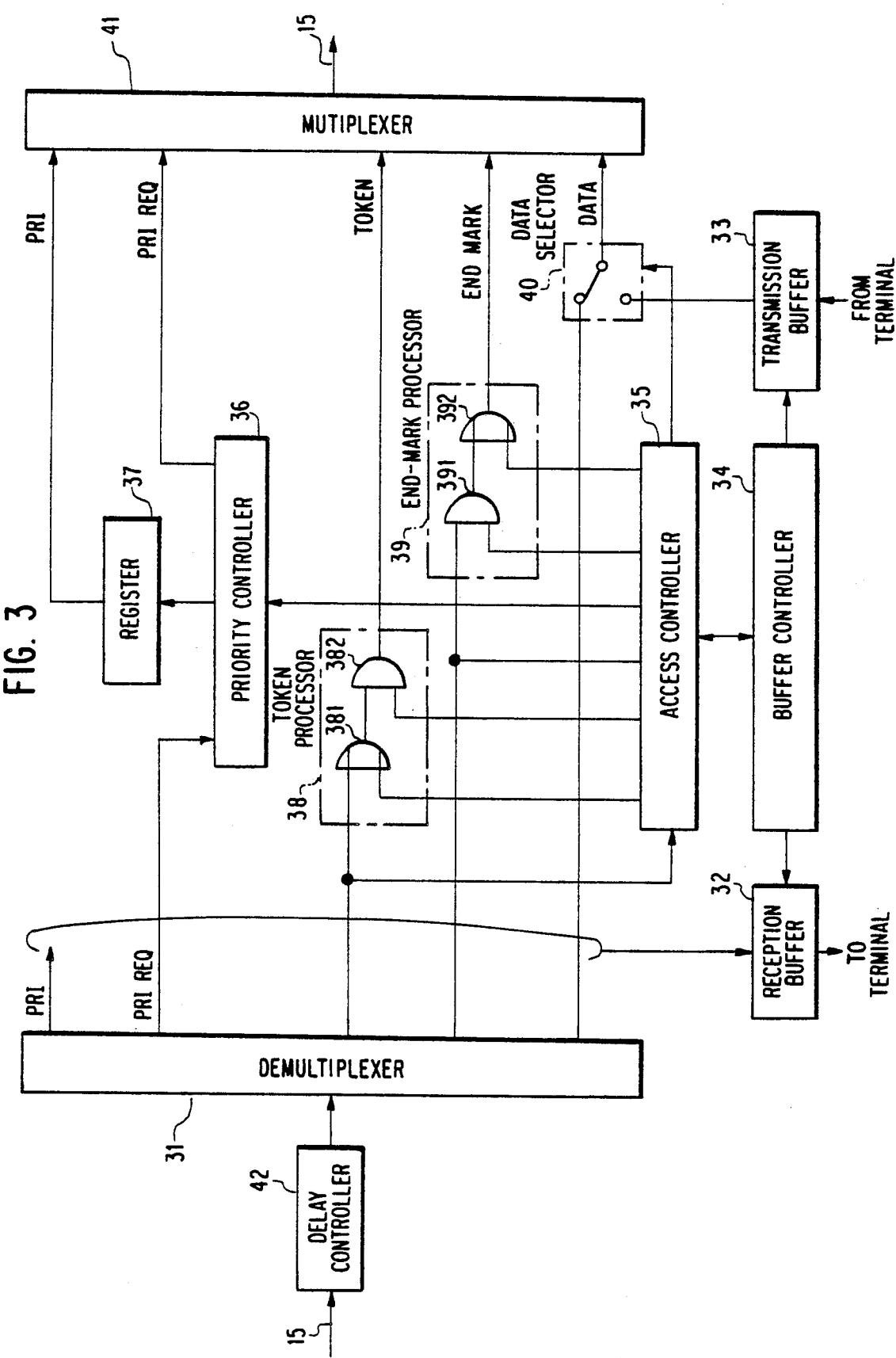
FIG. 3 is a block diagram of a master node station in the loop network in FIG. 1 according to an embodiment of the present invention.

Referring to FIG. 3, the master node station 11 comprises a demultiplexer 31 for demultiplexing each one of a sequence of slots incoming through the loop 15 to produce the priority signal (PRI), the priority request signal (PRI-REQ), the token/non-token signal (TOKEN), the end/non-end signal (END MARK), and the remaining portion of the slots as a data portion signal.

The master node station 11 further comprises a reception buffer 32, a transmission buffer 33, a buffer controller 34, an access controller 35, a priority controller 36, a register 37, a token processor 38, an end-mark processor 39, a data selector 40, and a multiplexer 41.

The reception buffer 32 temporarily holds the incoming slot signal and sends out the user's data portion in the incoming slot signal to a terminal (not shown) accommodated in the master node station 11 when the user's data signal in the user's data carrier portion of the incoming slot is destined to the terminal under control of the buffer controller 34.

The transmission buffer 33 temporarily stores a data signal as a buffered data signal from the terminal accommodated in the master node station 11. The buffer controller 34 monitors the transmission buffer 33 to detect the buffered data signal therein to be transmitted to the loop and delivers information for access control to the access controller 35.

The access controller 35 controls the buffer controller 34, the priority controller 36, the token processor 38, the end-mark processor 39, and the data selector 40 in the manner as will later be described.

The multiplexer 41 receives the priority signal (PRI) from the register 37, the priority request signal (PRI-REQ) from the priority controller 36, the token signal from the token processor 38, the end/non-end signal (END MARK) from the end-mark processor 39, and the data signal from the data selector 40, and produces a new slot signal having the format shown in FIG. 2 which is delivered to the loop 15.

When the master node station 11 does not have the token, the token processor 38, the end-mark processor 39 and the data selector 40 transfer the token/non-token singal T, the end/non-end signal E and the other data portion signal, respectively, from the demultiplexer 31 to the multiplexer 41.

The master node station 11 is provided with a delay controller 42 as a stage prior to the demultiplexer 31. The delay controller 42 is for controlling a loop delay of each slot to be equal to an integer time of the slot length.

Figure 4:
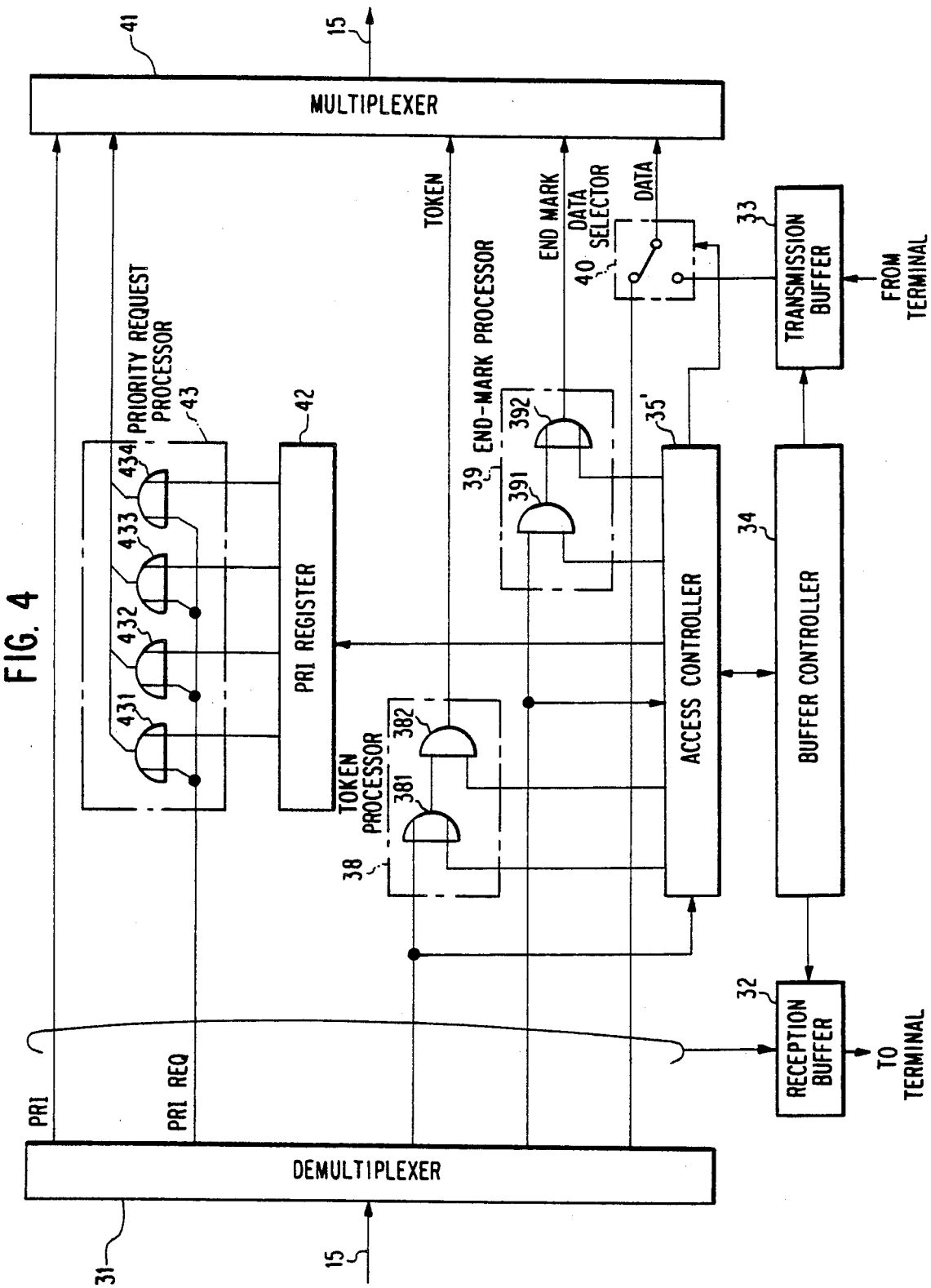
FIG. 4 is a block diagram of a slave node station in the loop network in FIG. 1 according to the embodiment of the present invention.

Referring to FIG. 4, each of the slave node stations 12–14 is similar to the master node station 11 and the similar portions are represented by the same reference numerals in FIG. 3. That is, the slave node station comprises the demultiplexer 31, the reception buffer 32, the transmission buffer 33, the buffer controller 34, an access controller 35', the token processor 38, the end-mark processor 39, the data selector 40, and the multiplexer 41. The slave node station further comprises a priority register 42 and a priority request processor 43 in place of the priority controller 36 and the register 37 in the master node station 11.

The access controller 35' in the slave node station is similar to the access controller 35 in the master node station but different in that the former controls the priority register 42 and the priority request processor 43 in place of the priority controller 36 and the register 37 in the master node station 11. Thereafter, the access controller in each of the slave node stations is represented by not 35 but 35'.

When each of the slave node stations has no data signal to be transmitted, the priority request processor 43, the token processor 38, the end-mark processor 39 and the data selector 40 are at a repeating condition and transfer the priority request signal, the token/non-token signal, the end/non-end signal and the other data signal from the demultiplexer 31 to the multiplexer 41. Further, the priority signal is directly transferred from the demultiplexer 31 to the multiplexer 41. Therefore, the each of the slave node stations repeats the incoming slot signal.

Figure 5:
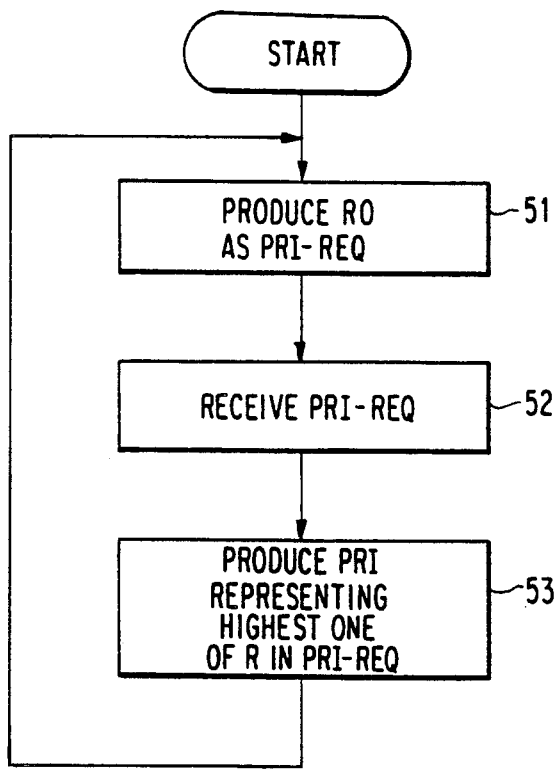
FIG. 5 is a flow chart illustrative of operation of priority control in the master node station in FIG. 4.

Returning to FIG. 3 and additionally referring to FIG. 5, description is made as to operation of the priority controller 36 and the register 37 in the master node station 11. On start of the system, the priority controller 36 produces a non-request code R0 (0000) as the priority request signal (PRI-REQ), as shown at a step 51 in FIG. 5. Then, the multiplexer 41 multiplexes the priority request signal (PRI-REQ) with other signals to form a slot signal which is delivered to the loop 15. The slot circulates the loop 15 and is received at the demultiplexer 31 in the master node station 11 as a returned slot signal. During the circulation, each of the slave node stations 12-14 writes into the priority request section 23 of the slot the request code R generated in each slave node station. The demultiplexer 31 in the master node station 11 separates the priority request section 23 from the returned slot signal to produce the priority request signal (PRI-REQ) which is received at the priority controller 36 as shown at a step 52. Then, the priority controller 36 generates a priority code P as the indication priority corresponding to the highest level of the request code R in the priority request signal (PRI-REQ) and writes the priority code P into the register 37. The register 37 delivers the priority code P as the priority signal (PRI) to the multiplexer 41, as shown at a step 53. The priority controller 36 again produce the non-request code R0 which is also delivered to the multiplexer 41. Then, a new slot is formed and delivered from the multiplexer 41 to the loop. The priority signal and the priority request signal are set in the header of the new slot. Thereafter, similar operation is repeated.

Figure 6:
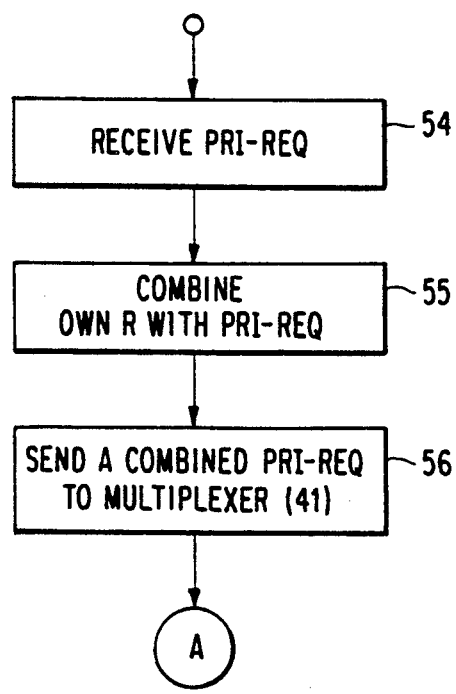
FIG. 6 is a flow chart illustrative of operation of priority request processor in each node station in FIG. 4.

Referring to FIGS. 4 and 6, description is now made as to operation of the priority request processor 43 under control of the priority register 42 and the access controller 35' in each of the slave node stations 12-14.

When the transmission buffer 33 holes the user's data signal to be transmitted to the loop, the access controller 35' detects a priority level of the user's data signal through the buffer controller 34. Then, the access controller 35' produces the request code R corresponding to the priority level and delivers the request code R to the priority register 42. The priority register 42 supplies the request code R to the priority request processor 43.

The slot delivered to the loop from the master node station 11 is received at the demultiplexer 31 in the slave node station. The demultiplexer 31 separates the priority request section in the slot and produces the priority request signal (PRI-REQ) which is applied to the priority request processor 43 at a step 54 in FIG. 6.

The priority request processor 43 comprises four OR gates 431 through 434 which are corresponding to the highest bit through the lowest bit of the request code R. The priority request signal (PRI-REQ) of four bits are applied to individual input terminals of OR gates 431-434 while four bits request code R are applied to individual second input terminals of OR gates 431-434. Therefore, the request code R is combined with the priority request signal (PRI-REQ) at a step 55 to produce a fresh one of the priority request signal (PRI-REQ).

In the node station, when the request code R is, for example, R1 (0001), the R1 is combined with the non-request code R0 (0000) of the received priority request signal (PRI-REQ), a code of the priority request signal is changed into a combined priority request code (R0+R1) or (0001).

The combined or changed priority request signal (PRI-REQ) is supplied to the multiplexer 41 at a step 56 and is multiplexed with the other repeated signals to reproduce the slot which is delivered to the loop.

At the downstream slave node station, when the request code R is, for example, R3 (0100), the code of the combined priority request (R0+R1) received thereat is combined with R3 and is changed into another modified priority request (R0+R1+R3) or (0101) in the similar manner as described above. Thereafter, the node station monitors the priority signal (PRI) in the slot received thereat.

Figure 7:
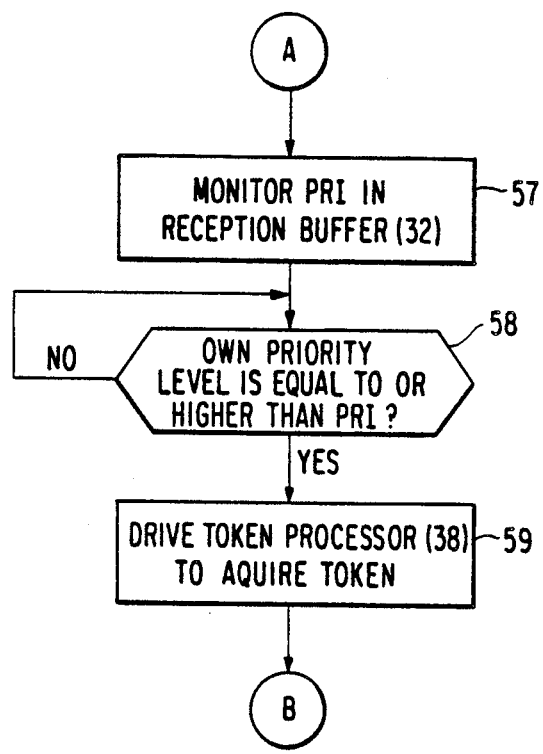
FIG. 7 is a flow chart illustrative of operation for acquiring a token by each node station in FIGS. 3 and 4.

Referring to FIG. 7, the access controller 35' monitors the priority signal (PRI) in the incoming slot signal stored in the reception buffer 32 through the buffer controller 34 at a step 57. The priority level indicated by the monitored priority signal (PRI) is compared with the owm priority level requested by the subscriber's data signal stored in the transmission buffer 33 at a step 58. When the former is lower than the latter, the access controller 35' makes the token processor 38 acquire the token code T1 at a step 59.

The token processor 38 comprises an OR gate 381 and an AND gate 382. The token/non-token signal T separated from the incoming slot at the demultiplexer 31 is applied to a first input terminal of the OR gate 381. An output of the OR gate 381 is coupled to a first input terminal of the AND gate 382. Second input terminals of the OR gate 381 and the AND gate 382 are coupled to the access controller 35'. The token/non-token signal T is also applied to the access controller 35'. Normally, the access controller 35' supplies an OR gate control singal with a level "0" and an AND gate control signal with a level "0" to the second input terminals of the OR gate 381 and the AND gate 382, respectively. Therefore, the token processor 38 is set in a repeating condition and repeats the token/non-token signal from said demultiplexer 31.

At step 59, the access controller 35' changes the AND gate control signal from level "1" to level "0" to set the token processor 38 in a non-token condition. Accordingly, the AND gate 382 produces the non-token code signal T0 "0" level as the token/non-token signal T. The non-token code signal T0 is carried in the token/non-token section (28 in FIG. 2) of the slot delivered from the multiplexer 41, whether the OR gate 381 produces "1" level signal or "0" level signal.

Figure 8:
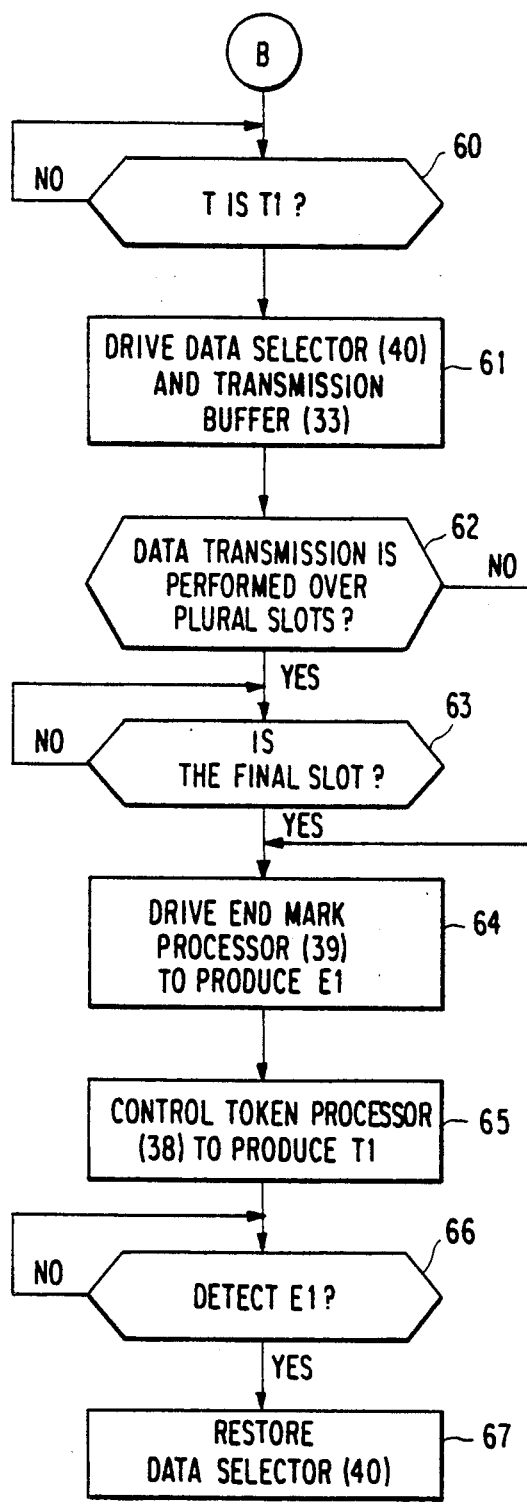
FIG. 8 is a flow chart illustrative of operation for transmitting data in a node station in FIGS. 3 and 4.

Thereafter, when the access controller 35' detects the token code T1 in the token/non-token signal T applied from the demultiplexer 31 at a step 60 in FIG. 8, the access controller 35' delivers a switch signal S to the data selector 40 so as to connect the transmission buffer 33 to the multiplexer 41 and a grant signal to the buffer controller 34 so as to start transmission of the subscriber's data signal stored in the transmission buffer 33 at step 61 in FIG. 8.

The user's data signal in the transmission buffer 33 is transmitted by a signal slot or a plurality of subsequent slots as described above.

The access controller 35' monitors the transmission buffer 33 through the buffer controller 34 to detect whether or not a plurality of slots are required for transmission of the user's data signal at a step of 62.

When a plurality of slots are required, the transmission buffer 33 holds the user's data signal together with the start code C1, the last code C3 and the intermittent code C2 which are carried in the chaining code section in individual slots delivered from the multiplexer 41.

Thereafter, the access controller 35' monitors through the buffer controller 34 at a step 63 whether or not the final slot is started from transmission of the buffered data in the transmission buffer 33. When the final slot is started, the access controller 35' drives the end mark pprocessor 39 to produce the end mark E1 at a step 64.

The end mark processor 39 comprises an AND gate 391 and an OR gate 392. The AND gate 391 has a first input terminal connected to the demultiplexer 31 for receiving the end/non-end signal E separated from the incoming slot signal by the demultiplexer 31. The AND gate 391 has an output terminal which is connected to a first input terminal of the OR gate 392. Second input terminals of the AND gate 391 and the OR gate 392 are connected to the access controller 35' for receiving control signals therefrom. Normally, the access controller 35' supplies an AND gate control signal with a level "1" and an OR gate control signal with a level "0" to the second input terminals of the AND gate 391 and the OR gate 392, respectively. Therefore, the end-mark processor 39 is maintained at a repeating condition and the end/non-end signal E from the demultiplexer 31 is repeated. The access controller 35' is also supplied with the end/non-end signal E from the demultiplexer 31.

At step 64. the access controll 35' changes the OR gate control signal from "0" level to "1" level to make the end-mark processor be in an end condition. Therefore, the OR gate 392 produces the end mark singal E1 of "1" level whether the output of the AND gate 391 is level "0" or "1" signal.

When the user's data signal can be transmitted by a single slot, or the user's data signal is the ATM signal, the transmission buffer 33 holds the user's data signal together with the single code C0 which is carried in the chaining code section in the slot delivered from the multiplexer 41. Then, the end mark E1 is also produced at step 64.

Therefore, the access controller 35' controls the token processor 38 into a token condition by changing the AND gate control signal from "0" level to "1" level and by supplying the OR gate control signal of a level "1" signal to the OR gate 381. Accordingly, the token code signal T1 of "1" is produced and delivered to the multiplexer 41 at step 65. Thereafter, the access controller 35' place the token processor in the repeating condition.

The end mark code signal E1 and the token code signal T1 are carried in the end/non-end signal section 25 and the token/non-token section 28 in the header portion 16 of the slot delivered from the multiplexer 41.

Then, the transmission of the user's data signal is completed.

Figure 9:
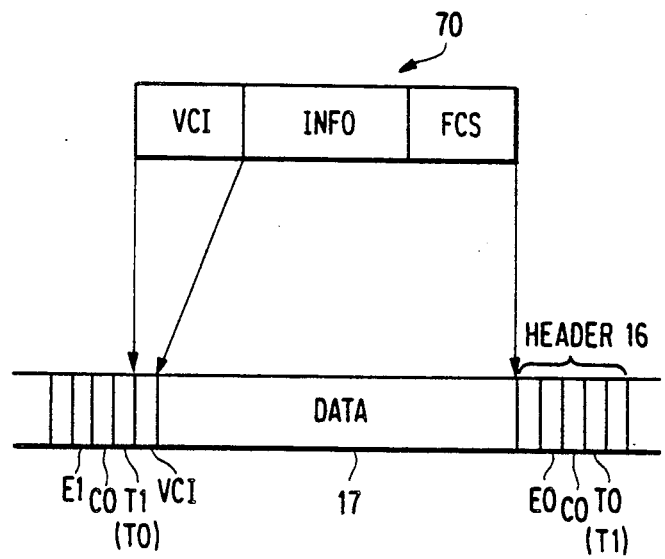
FIG. 9 is a diagram view illustrating a data frame in a node station and a slot sent out from the node station.

FIG. 9 illustrates transmission of an ATM packet signal by use of a signal slot. The ATM signal 70 has a frame which comprises a label section comprising VCI (virtual circuit indicator) and a data section comprising an information field INFO and a frame check sequence FCS. The slot for transmitting the ATM packet signal has the header portion 16 including the end mark signal E1, the signal code signal C0, the token code signal T1 and the VCI, and the data portion carrying the INFO and the FCS. The header of the next subsequent slot is shown in the figure and includes the non-end mark signal E0, the single code C0 and the non-token signal T0.

Figure 10:
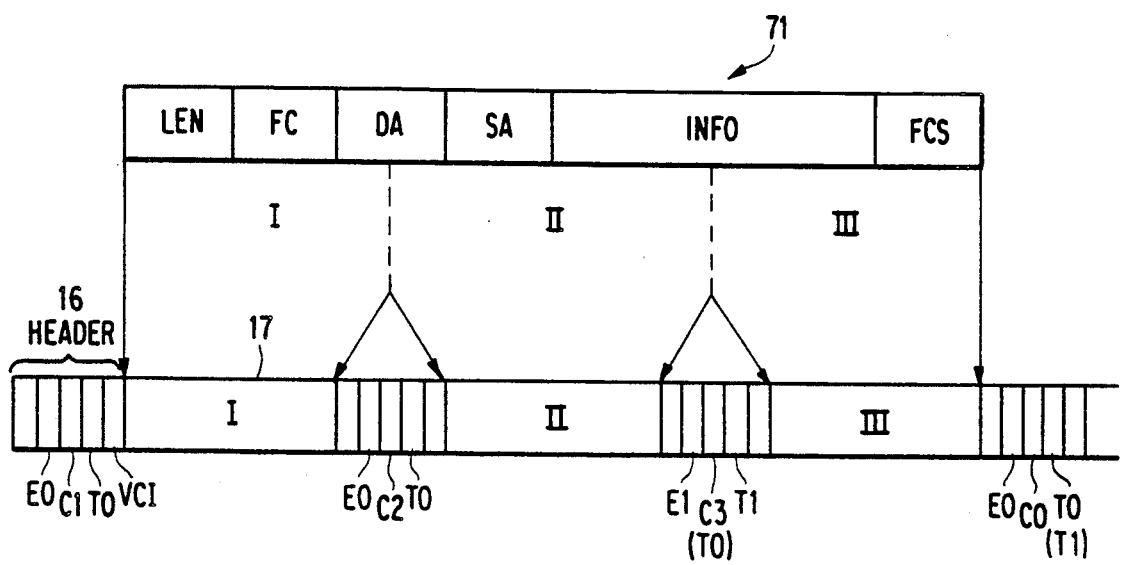
FIG. 10 is a diagram view illustrating another data frame in a node station and slots sent out from the node station.

FIG. 10 illustrates transmission of a simpple packet signal 71 as the user's data signal by use of three slots.

The signal 71 is divided into three blocks I, II and III which are carried in individual data carrier portions 17 in the three slots. As shown in the figure, the non-end signal E0, the non-token signal T0 and the start code C1 are carried in the header 16 in the first slot. The non-end signal E0, the non-token signal T0 and the intermediate signal C2 are carried in the header in the second slot. The header of the third or final slot has the end mark signal E1, the final code signal C3 and the token signal T1.

The header of the next subsequent slot has the non-end mark signal E0, the single code C0 and the non-token signal T0 like the slot shown in FIG. 9.

After the final slot is sent out from the multiplexer 41, the access controller 35' of the same node station detects the end mark signal E1 through the demultiplexer 31 at a step 66 in FIG. 8. Then, the access controller 35' delivers an idler signal to the data selector 40 so as to restore the data selector 40. Accordingly, the data selector 40 again couples the demultiplexer 31 to the multiplexer 41 so that the data portion ie repeated from the demultiplexer 31 to the multiplexer 41.

During a time period from step 61 to step 67 when the data selector 40 is switched onto the transmission buffer 33, incoming slots to the same node station are stripped.

Furthermore, since the token signal T1 is inserted in the final slot for transmission of the user's data signal at step 65, the next downstream node station can acquire the token signal T1 just after the next upstream node station aborts the transmission right by sending out the token signal T1.

In the example of FIG. 10, the transmission buffer 33 holds a data signal and transfers the data signal by use of three slots. However, when the transmission buffer 33 holds several data signals as the buffered data signal and continuously transfers those several data signals, the last code signal C3 is carried by an individual last one of slots for transferring each of the several data signals. However, the end mark signal E1 and the token signal T1 are not carried in all of the individual last slot and are only carried in the final one of slots for transferring the entire of the several data signals.

In the described embodiment, the token signal T1 is set in the final slot for transmission of the buffered data signal. However, the non-token signal T0 can be maintained in the final slot and the token signal T1 is freed in the next subsequent slot after the final slot. The case is shown by representations of (T0) and (T1) in FIGS. 9 and 10.

Referring to FIG. 11, description is made as to an exemplary case where #2 node station 12 sends out three slots 121–123 thereafter #3 node station 13 sends out four slots 131–134. At (b) in FIG. 11, the node station 12 delivers the three slots 121–123 to the loop. The slots 121–123 are received by the node station 13 at (c). Then, the node station 13 can capture the token signal T1. Therefore, the node station 13 repeats the slots 121–123 and transmits the slots 131–134 at (d). The slots 121–123 and 131–134 are received by the node station 12 at (a). The node station 12 is set in a slot stripping condition during a time duration D1 from the transmission start of slots 121–123 at (b) to the reception completion of the slots 121–123 at (a).

Thereafter, the node station repeats the slots 131–134 to the node station 13 at (b). Then, the node station 13 receives the slots 131–134. The node station 13 is set in a slot stripping condition during a time duration D2 from the transmission start of slots 131–134 at (d) to the reception completion of the slots 131–134 at (c).

Therefore, slot stripping can readily be performed by use of the end mark signal without use of any address information.

What is claimed is:

1. A token passing type slotted loop network system comprising a master node station and a plurality of slave node stations connected to each other to form a data transmission loop, a plurality of slots being circulated on said loop for transmitting a data signal from a particular one of the node stations having the token, each of said slots having a fixed length and comprising:
a header portion comprising an end/non-end code section for carrying the end/non-end code, the end code and the non-end code representing an end and a non-end of transmission of the data signal; and
a data carrier portion for carrying the data signal, each of said master and slave node stations comprising:
multiplexing means for multiplexing input signals applied thereto to produce a multiplexed signal, said multiplexed signal being delivered therefrom to said loop;
transmissions buffer means for holding the data signal to be transmitted to said loop as a buffered data signal as one of said slots;
demultiplexing means for demultiplexing each of said slots sequentially incoming thereto as an incoming slot signal to produce said end/non-end code section and said data carrier portion of said incoming slot signal as a separated end/non-end signal and a separated data signal;
selecting means coupled to said demultiplexing means and said transmission buffer means for selecting said separated data signal at a repeating mode and said buffered data signal at a transmission mode as a selected signal, said selected signal being delivered to said multiplexing means as one of said input signals;
end-mark processing means coupled to said demultiplexing means for repeating said separated end/non-end signal to said multiplexing means as another one of said input signals at a repeating mode, said end-mark processing means producing a non-end code signal and an end code signal to deliver the non-end code signal and the end code signal to said multiplexing means as another one of said input signals at a non-end condition and an end condition, respectively; and
control means coupled to said demultiplexing means, said transmission buffer means, said selecting means and said end-mark processing means for controlling said end-mark processing means and said selecting means.

2. A token passing slotted loop network as claimed in claim 1, wherein, in said particular node station, said control means makes said end-mark processing means and said selecting means be in said non-end condition and in said transmission mode, respectively, said control means monitoring said transmission buffer means and making said end-mark processing means be in said end condition to produce said end code signal at an end of transmission of said buffered data signal, said control means making said end-mark processing means and said selecting means be in said repeating condition and in said repeating mode, respectively, when said control means detects that said demultiplexed end/non-end signal is said end code signal, and wherein, in each of the node stations other than said particular node station, said control means makes said end-mark processing means and said selecting means be in said repeating condition and in said repeating mode, respectively.

3. A token passing slotted loop network as claimed in claim 2, wherein said header portion further comprises a token/non/token code section for carrying one of a token code representing the token and a non-token code, said demultiplexing means separating said token/non-token code section from said incoming slot signal to produce a separated token/non-token signal, and wherein each of said master and said slave node stations further comprises token processing means coupled to said demultiplexing means for repeating said separated token/non-token signal to said multiplexing means as another one of said input signals at a repeating condition, said token processing means producing the non-token code signal and the token code signal to deliver the non-token code signal and the token code signal at a non-token condition and a token condition, respectively, to said multiplexing means as another input signal, said control means controlling said token/non-token processing means.

4. A token passing slotted loop network as claimed in claim 3, wherein said control means makes said token processing means be in said non-token condition in order to acquire the token when detecting that said transmission buffer means holds said buffered data signal, said control means acquiring the token when detecting that said separated token/non-token signal is said token code signal, and said control means, as said control means in said particular node station, making said end-mark processing means and said selecting means be in said non-end condition and said transmission mode.

5. A token passing slotted loop network as claimed in claim 4, wherein, in said particular node station, said control means makes said token processing means be in said token condition so as to free the token at the end of transmission of said buffered data signal and then makes said token processing means into said repeating condition.

6. A token passing slotted loop network as claimed in claim 4, said data signal having a priority of one of different priority levels from a minimum level to a maximum level, wherein said header portion further comprises a priority request section for carrying a priority request representing a priority level requested at each of said slave node stations, and a priority section for carrying the highest priority level in said priority request as an indication priority level, said demultiplexing means separating said priority request section from said incoming slot signal as a separated priority request, and wherein said master node station further comprises priority control means coupled to said demultiplexing means responsive to said separated priority request for detecting the highest priority level in said separated priority request as a detected priority level to set said detected priority level in said priority section as said indication priority level, said priority control means setting the minimum level in said priority request section.

7. A token passing type slotted loop network as claimed in claim 6, said control means in each of said slave node stations monitoring said transmission buffer means to detect a particular one of the priority levels requested by said buffered data signal in said transmission buffer means as a particular priority request, wherein each of said slave node stations further comprises priority register means coupled to said control means for holding said particular priority request; and priority request processing means coupled to said demultiplexing means and said priority register means for producing a specific priority request from said particular priority request and said separated priority request to deliver said specific priority request as another one of said input signals to said multiplexing means.

8. A token passing type slotted loop network system as claimed in claim 7, wherein, in each of said slave node station, said demultiplexing means demultiplexes said priority section in said incoming slot signal as a separated priority signal, said separated priority signal being delivered as another of said input signals to said multiplexing means, said control means responsive to said separated priority signal for comparing said indication priority level of said separated priority signal with said particular priority request level, said control means making said token processing means be in said non-token condition when said particular priority request level is equal to or higher than said indication priority level of said separated priority signal.

9. A token passing type slotted loop network system as claimed in claim 7, said priority being divided into N (N being an integer) levels from said minimum level to said maximum level, said priority request being represented by a binary code of N digits with "1" in different digits representing different priority levels so that "1" of the highest and the lowest digits represents the maximum and the minimum levels, wherein said priority request processing means comprises means for writing "1" into a particular digit in said separated priority request signal corresponding to said particular priority request.

* * * * *

UNITED STATES PATENT AND TRADEMARK OFFICE
CERTIFICATE OF CORRECTION

PATENT NO. : 5,070,501
DATED : Dec. 3, 1991
INVENTOR(S) : Hiroshi Shimizu

It is certified that error appears in the above-identified patent and that said Letters Patent is hereby corrected as shown below:

Col. 8, line 59, delete ""0"" and insert therefor --1--;

Col. 9, line 51, delete "controll" and insert therefor --controller--;

Col. 10, line 46, delete "ie" and insert therefor --is--.

Signed and Sealed this

Twentieth Day of April, 1993

Attest:

MICHAEL K. KIRK

*Attesting Officer*     Acting Commissioner of Patents and Trademarks